(12) United States Patent
Cairns

(10) Patent No.: US 8,731,363 B2
(45) Date of Patent: May 20, 2014

(54) OPTICAL FIBER MANAGEMENT DEVICE

(71) Applicant: Teledyne Instruments, Inc., Thousand Oaks, CA (US)

(72) Inventor: James Cairns, Ormand Beach, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 13/793,740

(22) Filed: Mar. 11, 2013

(65) Prior Publication Data

US 2013/0216196 A1 Aug. 22, 2013

Related U.S. Application Data

(63) Continuation-in-part of application No. 13/557,254, filed on Jul. 25, 2012.

(60) Provisional application No. 61/599,508, filed on Feb. 16, 2012.

(51) Int. Cl.
*G02B 6/00* (2006.01)
*B65H 75/08* (2006.01)

(52) U.S. Cl.
USPC .......................................... 385/135; 242/591

(58) Field of Classification Search
USPC ............................................................ 242/591
See application file for complete search history.

(56) References Cited

U.S. PATENT DOCUMENTS 6,722,602 B2 * 4/2004 Mims ......................... 242/388.6
2008/0296426 A1 * 12/2008 Cairns et al. ............... 242/157 R

* cited by examiner

*Primary Examiner* — Jerry Rahll
(74) *Attorney, Agent, or Firm* — Procopio Cory Hargreaves & Savitch LLP

(57) ABSTRACT

An apparatus and method for managing one or more flexible lines such as optical fibers, wherein each fiber has two fixed ends. Optical fibers are arranged in a curved figure-eight pattern lying in three-dimensions and having two adjacent loops on the exterior curved winding surface of a tubular shell. The configuration is guided by winding tracks lying axially on the exterior side of shell. The curvatures of the shell and winding tracks are such that the bend of the managed fibers is everywhere equal to or greater than the fiber minimum bend radius.

14 Claims, 4 Drawing Sheets

OPTICAL FIBER MANAGEMENT DEVICE

CROSS-REFERENCE TO RELATED APPLICATION

This application is a continuation-in-part application of U.S. patent application Ser. No. 13/557,254 filed on Jul. 25, 2012, which claims the benefit under 35 U.S.C. §119(e) of the earlier filing date of U.S. Provisional Patent Application No. 61/599,508 filed on Feb. 16, 2012, which is hereby incorporated by reference.

BACKGROUND

The invention relates generally to an apparatus and method for managing lengths of extended flexible elements whose ends are both either fixed or inaccessible. Optical fibers, for example, are often used to connect components within a limited space. As an illustrative example, fiber management devices are used in applications wherein fiber-carrying cables are joined within a containment enclosure to other cables or components. When such cable junctions are made, one or more optical fibers issue from the end of the cable in which they are imbedded. The ends of these fibers go to attachment points of the component or other cable to which the cable is terminated. Excess fiber, always needed to complete the process, is stored within the enclosure. Because both ends of the fiber are fixed, it cannot simply be wound on a reel. If it were, each turn around the reel would result in a half-turn torque on the fiber. To avoid that torque and the concomitant twisting resulting from it, it is well known to arrange the fiber in a figure eight configuration. That way there is a turn of the fiber in one sense followed immediately by a turn in the other sense, thereby cancelling out the torque. Additionally, optical fibers must not be stored while bent in a radius that is less than the minimum allowable for the fiber. If bent at a lesser radius, there is unacceptable loss of the optical signal propagating within the fiber; and, if bent too sharply the fiber can be damaged. Termination enclosures are kept as small as possible in order to facilitate handling, and to reduce cost. Therefore, in the management of excess fiber within a termination enclosure the usual goals are to configure the fiber as a "figure-eight' while minimizing both the diameter and axial length of the managed fiber commensurate with the fiber's minimum allowable bend radius. The foregoing example is only one of many that could be cited wherein optical fibers must be managed in a compact figure-eight configuration. Alternatively, there are applications wherein length minimization is not required, and wherein a somewhat open environment is desirable. There is a wide range of applications for simple, compact fiber management devices.

Existing art, some of which is described herein, does not completely fulfill the needs of these applications. It is, therefore, advantageous to have an improved device and method to manage optical fibers whose ends are both either fixed or inaccessible.

SUMMARY OF THE INVENTION

The invention provides a new and improved method and apparatus for managing optical fibers. The invention is herein described as it would be used within a termination chamber. It comprises a guide formed as a tubular-section upon whose curved exterior surface fiber is arranged in a figure-eight pattern. Nowhere is the fiber bent to a curvature less than its minimum allowable bend radius. Winding tracks on opposite exterior sides of the guide with respect to a first disclosed embodiment and on one side of the guide with respect to an additional disclosed embodiment have radii greater than or equal to the fiber minimum bend radius. A feature is provided on the guide to mechanically affix it to a structural element of the chamber in which it is housed. As opposed to the prior art, examples of which are found in U.S. Pat. No. 7,769,265 of Cairns, the contents of which are incorporated herein by reference, the invention takes advantage of the possibility of bending the managed fibers in three dimensions, thereby reducing both the size and complexity of the management assembly. Prior art management devices wind the fibers in a two dimensional plane, that plane generally coinciding with the long axis of the termination chamber. The invention can be used equally well with one or more individual fibers, or with multi-fiber ribbons. The apparatus and method disclosed herein are also suitable for use within, for example, the fluid-filled chamber of a harsh environment connector such as that disclosed in co-pending U.S. application Ser. No. 13/296,406 to Cairns, the contents of which are incorporated herein by reference. In certain applications the ability to mange fibers within the connector unit itself is advantageous.

An additional embodiment provides an apparatus and method to manage the fibers in a 3-dimensional configuration which keeps the diameter of the management device minimized, while providing a more open surface upon which to arrange the excess fiber. Winding tracks are provided on the same exterior side of the guide and have radii greater than or equal to the fiber minimum bend radius. This additional embodiment provides an apparatus and method suitable for use within, for example, terrestrial management devices wherein length is not a critical factor.

BRIEF DESCRIPTION OF THE DRAWINGS

Various embodiments of the invention are described herein by way of example in conjunction with the following figures, wherein like reference characters designate the same or similar elements.

DETAILED DESCRIPTION

Figure 1:
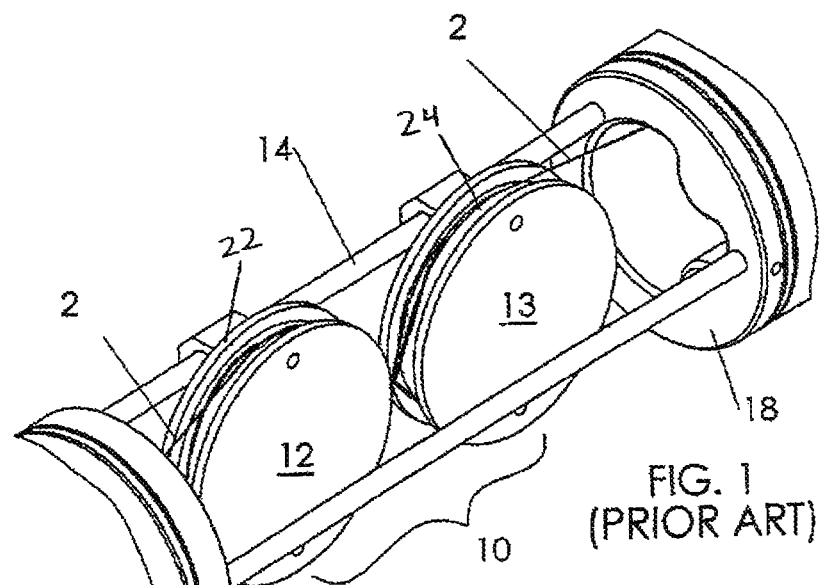
FIG. 1 is an example of prior art in which the fiber is wound in a figure-eight on two reels situated on a plane parallel to the long axis of the termination chamber.

FIG. 1 illustrates an example of an early prior art fiber management apparatus 10. Element 16 (FIG. 1) represents a structural element on the posterior portion of the termination chamber from which optical fibers issue from the bitter end of a cable. Element 18 (FIG. 1) on the anterior end of the termination chamber represents the connector, cable, or other component to which optical fibers issuing from element 16 are attached. Rod 14 (FIG. 1) is a structural feature of the termination chamber to which management reels 12, 13 are affixed. Reels 12, 13 are positioned in line on a plane parallel to the long axis of the termination assembly. The reels each comprise a central winding track 24, and side rails 22. Central winding tracks 24 have radii greater than or equal to the minimum bend radius of the fibers to be managed. Fibers 2 are wound around the far-side track of one of the reels, cross over between reels to pass in the opposite sense around the far-side track of the opposed reel, and so on until the excess fiber is substantially all organized in a figure eight pattern on the two reels.

Figure 2:
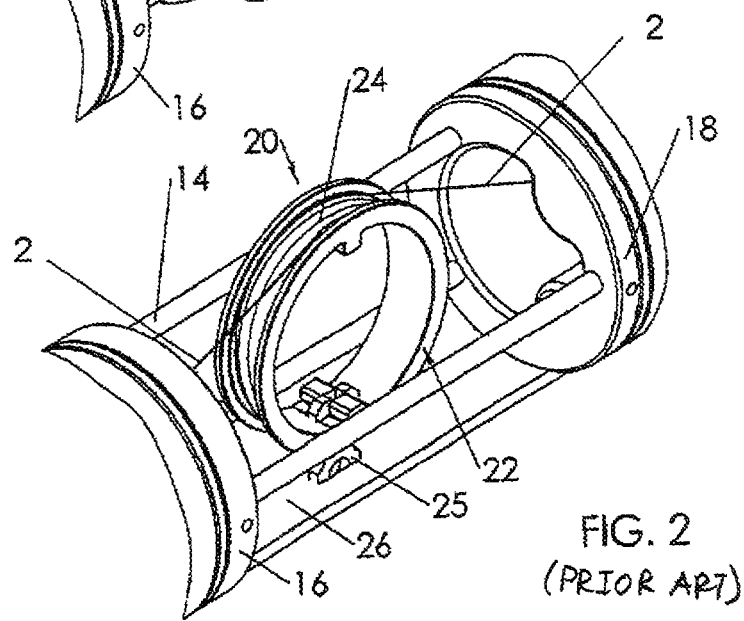
FIG. 2 is an example of prior art in which the fiber is wound on one reel with a winding track situated on a plane parallel to the long axis of the termination chamber.

FIG. 2 illustrates a later example of prior art. Element 16 (FIG. 2) represents a structural element on the posterior portion of the termination from which optical fibers issue from the bitter end of a cable. Element 18 (FIG. 2) on the anterior end of the termination chamber represents the connector, cable, or other device to which optical fibers issuing from element 16 are attached. Rod 14 (FIG. 2) is a structural feature of the termination chamber to which management reel 20 is affixed. Reel 20 is positioned on a plane parallel to the long axis of the termination assembly. Reel 20 comprises a central winding track 24, and side rails 22. Central winding track 24 has a radius greater than or equal to the minimum bend radius of the fibers to be managed. Guide 25 (FIG. 2) is a blade-like feature that extends radially outward from the center of winding track 24, channeling fibers 2 either to the left or right side of said guide. As an example of its use, a fiber is first wound around the reel on the left side of guide 25, crosses over onto the right side of the winding track on the side diametrically opposed to guide 25; it then continues around the reel to pass in the opposite sense around the right side of guide 25, and so on. The fiber forms a figure eight in which two flat loops are effectively folded back on each other. Fiber is wound in this manner until the excess fiber is substantially all organized in a figure-eight pattern in which the flat loops are folded back on each other on the single reel. This method and apparatus, disclosed in U.S. Pat. No. 7,769,265 and shown in FIG. 2, represented a step forward in the art of fiber management as they significantly shortened the length of the termination chamber required by the earlier art shown in FIG. 1. But the FIG. 2 figure-eight aspect of the fiber pattern cannot be seen by the operator, thus making the winding technique conceptually difficult. That can easily lead to winding errors, which is a shortcoming of that existing art.

The present invention provides a more intuitive apparatus and method for winding fibers in a clearly visible figure-eight configuration; at the same time, it further reduces the space required to do so. It takes advantage of the ability of bending the fibers in three dimensions, as opposed to a two-dimensional plane as previously was done. An useful metaphor for understanding the concept of a first embodiment of the invention is achieved by drawing a figure-eight on a flat piece of paper, then rolling the paper into a hollow cylinder so that the long axis of the figure-eight wraps around the curved outer surface of the rolled sheet.

In the following description, embodiments of an apparatus and method for managing one or more flexible lines such as optical fibers are described, but the described apparatus and methods may alternatively be used for managing other types of flexible line or flexible elongate elements, such as electrical or other flexible wires, cables, ropes, flexible tubes or hoses, threads, or the like. In the case of optical fiber, the fiber may be one or more individual optical fibers or a ribbonized fiber (ribbon fiber). Ribbon fiber contains multiple fibers in a ribbon-like form. The management apparatus and methods for flexible elongate elements or lines other than fibers may be identical to those described in the embodiments below, with appropriate adjustment of the scale and material of the apparatus to accommodate flexible elongate elements of different sizes and materials.

Figure 3:
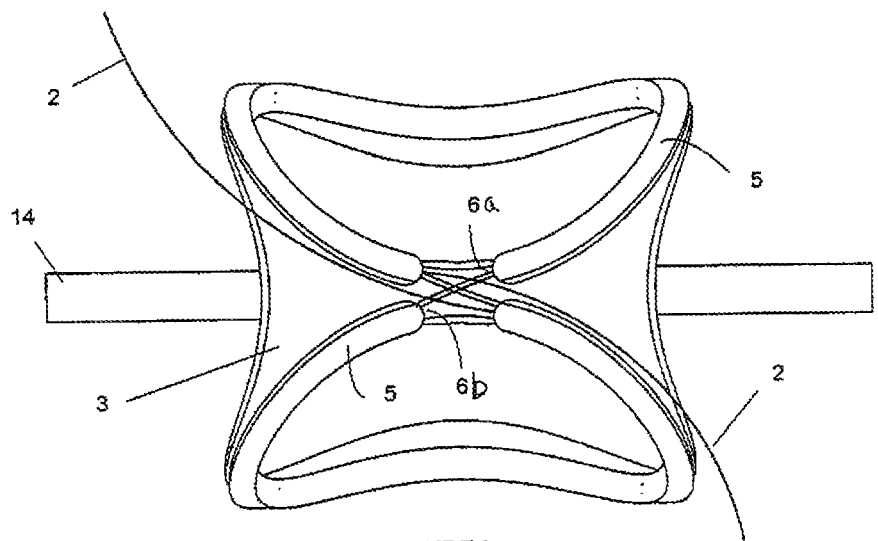
FIG. 3 is a bottom view of the fiber management apparatus showing the curved three-dimensional figure-eight winding pattern.
Figure 4:
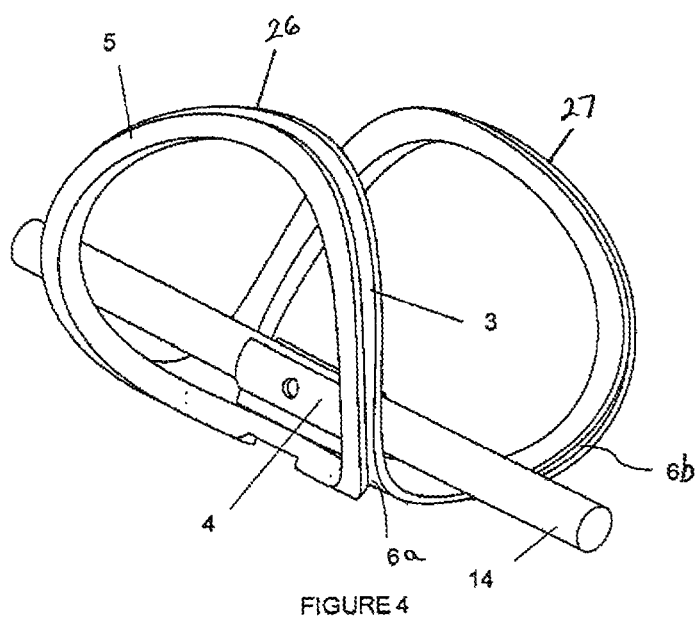
FIG. 4 is a perspective view of the fiber management apparatus.
Figure 5:
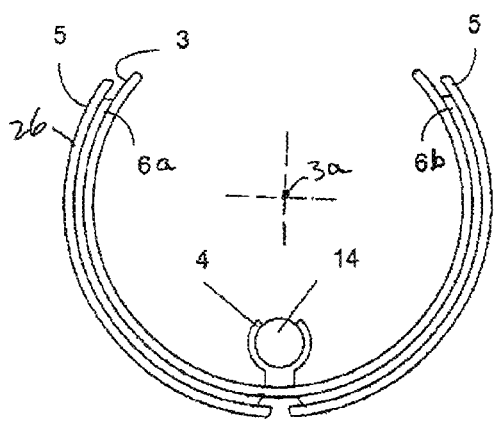
FIG. 5 is an end view of the fiber management apparatus first embodiment.

FIGS. 3 and 4 are bottom and perspective views respectively of a first embodiment of the invented management apparatus comprising cylindrically curved tube or shell 3 with attachment member 4, for affixing the apparatus to rod 14 which is a structural feature of the termination chamber as described in the previous examples of prior art. In the illustrated embodiment, attachment member 4 is shown, by way of example, to be a clamp having a C-shaped cross-section with upwardly curved sides that clamp around rod 14. Alternatively, other types of attachment members could be used to attach the apparatus to rod 14. Optical fibers 2 are arranged in a curved figure-eight pattern on the exterior curved winding surfaces of shell 3 (FIG. 3). As shown in FIGS. 3-5, the winding surfaces comprise radially-outwardly extending winding tracks 6a, 6b which lie conformably on the outer surface of shell 3 in such a way that their concavity face axis 3a of shell 3. The radially outward portions of winding tracks 6a, 6b terminate with lips 5 to retain fibers 2 upon the winding tracks. The curvatures of shell 3 and winding tracks 6 are such that the bend of the managed fibers is everywhere equal to or greater than the fiber minimum bend radius. From the FIG. 3 perspective, the operator has a clear view of the figure-eight fiber pattern, thereby making the winding process intuitively very simple.

FIG. 5 is an end view of a first embodiment of the invented fiber management apparatus. Shell 3 is a section of a cylindrical tube upon which winding tracks 6a, 6b lay conformably. The structure has the advantage over prior art in that it leaves the axially central portion open for the passage of other elements, such as for electrical conductors in the case of electro-optical cable terminations. Known prior art management devices block the central portion.

The just-described first embodiment of the invention does not completely minimize the size of the management device. To minimize the size, the curvature at all points along the winding path would be just equal to the minimum bend radius of the fiber. Shell 3 of the first embodiment is formed from a cylindrical section. But a somewhat sharper curvature at cross-over area 7 (FIG. 6) would not cause the fibers lying upon it to be bent less than their minimum bend radius for the following reason: As the fibers travel from their winding track on one side of shell 3 to the corresponding winding track on the opposite side of shell 3 in cross-over area 7, their paths have an axial component lying along the curved surface. They do not travel directly in a radial path around the curved surface. Increasing the curvature of shell 3 in area 7 provides an opportunity to slightly further reduce the size of the management device.

Figure 6:
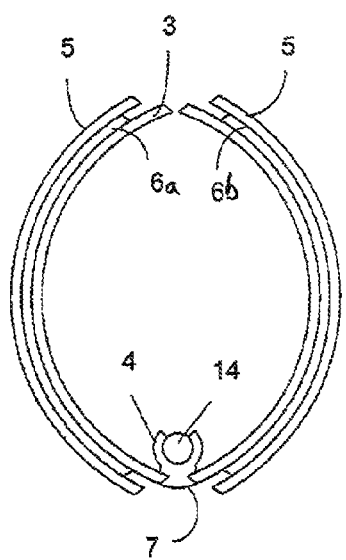
FIG. 6 is an end view of the fiber management apparatus alternative embodiment.

FIG. 6 is an end view of a second embodiment of the invented fiber management apparatus. In this case, the portions of shell 3 upon which winding tracks 6a, 6b conformably lay are formed from sections of a cylindrical tube as in the first embodiment. But in this second embodiment the curvature of shell 3 is sharper at portion 7 where the winding tracks from either side of shell 3 come in close proximity, and at which portion the windings of the figure-eight fiber pattern cross over each other. Compared to the first embodiment, this second embodiment further reduces the diameter of the termination chamber required to house it by about 5%, albeit at some cost to the openness of the central passage.

In either of the aforementioned embodiments of the invention at least some small gap is desirable on the portion of the management device opposite cross-over area 7. Such a gap allows the passage into and out of the diametrically central area of the device of wires and/or fibers whose ends are not free.

In embodiments of the invention the management of flexible lines or fibers having two fixed ends goes as follows. Fibers to be managed can enter winding tracks 6a, 6b at any point by positioning a portion of the fiber between the two fixed ends onto the winding tracks 6a, 6b. Management then proceeds by winding the fiber in a loop around a first track until it reaches cross-over area 7, from which it proceeds onward to wrap in a loop around the radially opposed second track in the opposite sense. When it again reaches cross-over area 7 it extends over cross-over area 7 to once again wrap around the first track, then extends back over cross-over area 7 again, and thereafter repeating the winding and extending steps until substantially all of the excess fiber has been managed. The fiber can exit the tracks at any convenient point.

Figure 7:
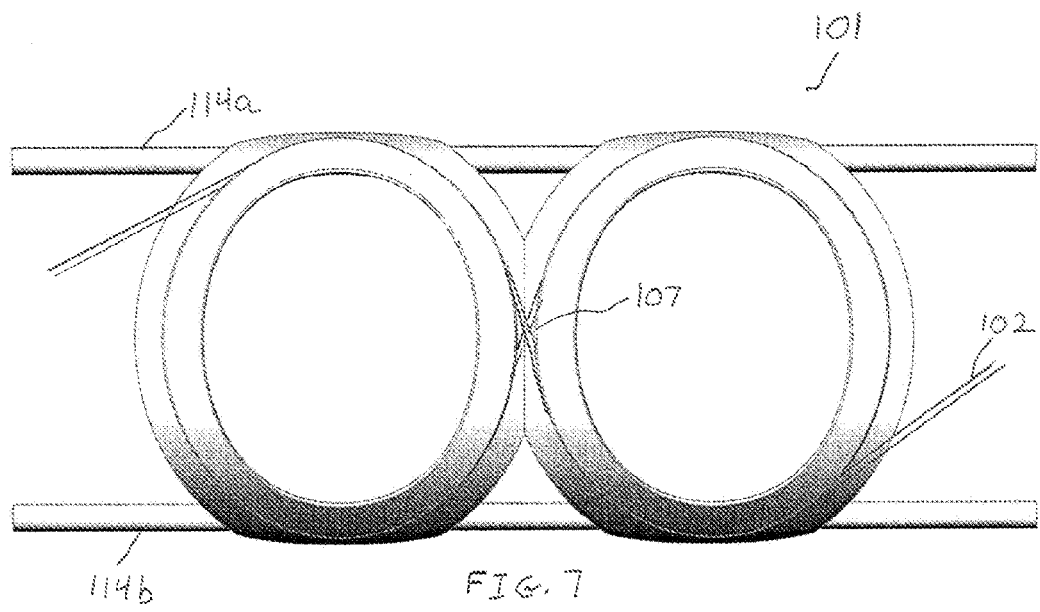
FIG. 7 is a front view of the management device according to a yet another embodiment of the invention.
Figures 8, 9:
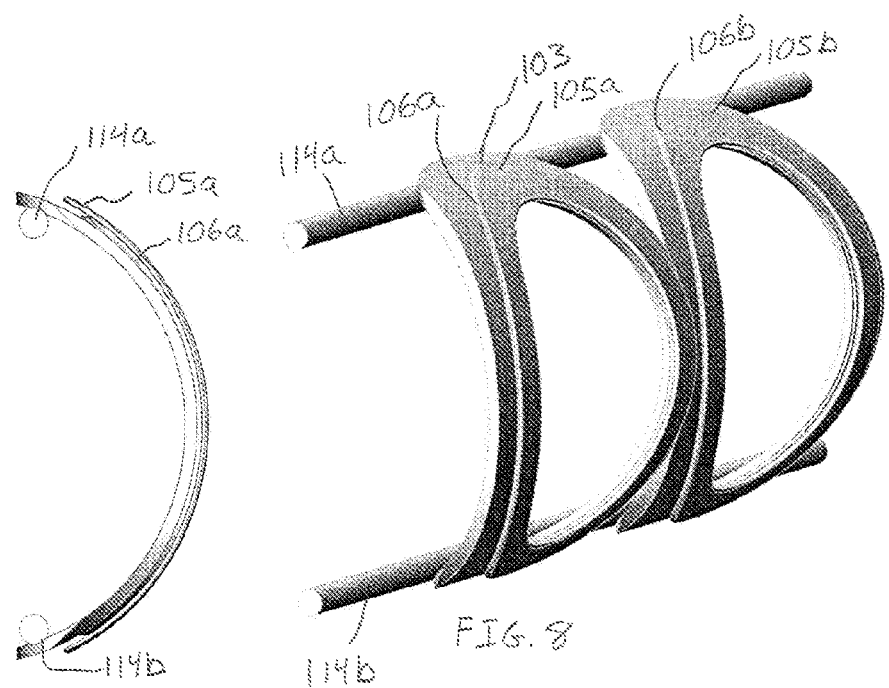
FIG. 8 is a perspective view of the management device according to FIG. 7.
FIG. 9 is an end view of the invented management device according to FIG. 7.

A further embodiment, illustrated in FIGS. 7-9, differs from the embodiments of FIGS. 1-6 in that the metaphorical figure-eight drawn on the flat piece of paper, is rolled into a hollow cylinder so that the long axis of the figure-eight axially along the curved outer surface of the rolled sheet. In other words, this embodiment's figure eight pattern lies at right angles to that described in the embodiment disclosed in the embodiments of FIGS. 1-6. That makes the device longer than the embodiment disclosed in the embodiments of FIGS. 1-6, but provides a more open winding area. The figure-eight configuration of the winding surface has two loops lying side by side and sharing a common longitudinal axis passing through their centers of curvature with a longitudinal axis extending through the center of curvature of both loops; wherein the curved winding surface is formed in the shape of a section of a cylindrical tube having a longitudinal axis; and wherein the longitudinal axis of the cylindrical tube is coincident to the longitudinal axis passing through the center of curvature of the loops in the figure-eight configuration.

Referring to FIGS. 7-9, there is illustrated a first embodiment of the fiber management apparatus comprising cylindrically curved surface or shell 103 attached to a pair of parallel rods 114a, 114b, for example, by welding. Rods 114a, 114b are used to affix management device 101 to the enclosure housing. Optical fibers 102 (shown in FIG. 7) are arranged in a curved figure-eight pattern on exterior curved winding surfaces 106a, 106b. (FIG. 9). As shown in FIG. 8, the winding surfaces comprise radially-outwardly extending winding tracks 106a, 106b which lie conformably on the outer surface of shell 103 in such a way that their concavity faces the long axis of shell 103. The radially outward extending winding tracks 106a, 106b terminate with lips 105a, 105b to retain optical fibers 102 upon the winding tracks. The curvatures of shell 103 and winding tracks 106a, 106b are such that the bend of the managed fibers is everywhere equal to or greater than the fiber minimum bend radius. From the FIG. 7 perspective, the operator has a clear view of the figure-eight fiber pattern, thereby making the winding process intuitively very simple and in the same manner as discussed above with winding the fiber in a loop around a first track until it reaches cross-over area 107, from which it proceeds onward to wrap in a loop around the axially adjacent second track in the opposite sense. The managing operation is facilitated by the open architecture of the device.

FIG. 9 is an end view of the invented fiber management apparatus. Shell 103 is a section of a cylindrical tube upon which winding tracks 106a, 106b lay conformably. The structure leaves the axially central portion open for the passage of other elements, such as for electrical conductors in the case of electro-optical cable terminations.

It will be understood by those skilled in the art that modifications can be made to the disclosed embodiments without departure from the scope or spirit of the invention, which is defined by the appended claims.

What is claimed is:

1. An apparatus for managing one or more flexible lines each having two fixed ends comprising:
   a winding surface having a curved figure-eight configuration lying in three-dimensions, wherein the figure-eight configuration has two loops lying side by side and sharing a common longitudinal axis passing through their centers of curvature;
   wherein the winding surface is formed in the shape of a section of a tube having a longitudinal axis;
   wherein the longitudinal axis of the tube is coincident with the longitudinal axis passing through the centers of curvature of both loops of the figure-eight configuration.

2. The apparatus of claim 1,
   wherein the section of a tube is cylindrical.

3. The apparatus of claim 1, wherein the apparatus is configured to be attached to a pair of parallel rods.

4. The apparatus of claim 1, wherein the winding surface comprises two curved winding tracks each having a concavity facing the longitudinal axis of the tubular section upon which it is formed.

5. The apparatus of claim 4, wherein the two curved winding tracks are configured so that the one or more flexible lines can be arranged to wrap in a figure-eight pattern circumferentially around the winding surface.

6. The apparatus of claim 5, wherein the winding tracks protrude radially outward from the winding surface.

7. The apparatus of claim 6, further comprising lips on radially outward portions of the winding tracks configured to keep the flexible line from escaping from the tracks.

8. The apparatus of claim 6, wherein each flexible line comprises one or more optical fibers having a minimum allowable bend radius, and wherein the winding tracks guide the flexible line conformably along the winding surface in a figure-eight pattern in which the loops have radii always greater than or equal to the minimum bend radius of the fibers.

9. The apparatus of claim 1, wherein the flexible line comprises one or more optical fibers having a minimum allowable bend radius, and wherein the winding surface is formed in the shape of radially opposed sections of a cylindrical tube joined by an outwardly curved surface whose curvature maintains the optical fibers at or slightly greater than their minimum allowable bend radius.

10. The apparatus of claim 9, wherein the apparatus is configured to be attached to a pair of parallel rods.

11. The apparatus of claim 9, wherein the figure-eight configuration is guided by winding tracks which protrude radially outward from the winding surface.

12. The apparatus of claim 11, further comprising lips on radially outward portions of the winding tracks that are provided to keep the fibers from escaping from the tracks.

13. The apparatus of claim 11, wherein the flexible line comprises one or more optical fibers having a minimum allowable bend radius, and wherein the winding tracks guide the flexible line conformably along the winding surface in a curved figure-eight pattern in which the loops have radii always greater than or equal to the minimum bend radius of the optical fibers.

14. A method for managing a flexible line having two ends fixed relative to a management apparatus having a winding surface including a curved figure-eight configuration lying in three-dimensions and having two axially adjacent loops, wherein the winding surface is formed in the shape of a section of a tube having a longitudinal axis, wherein the longitudinal axis of the tube is coincident with the longitudinal axis passing through the centers of curvature of both loops of the figure-eight, the method comprising:

positioning a portion of the flexible line between the two fixed ends onto the winding surface having the shape of a section of a tube;

winding a length of line around a first loop of the figure-eight configuration, extending the line over a cross-over area, winding the length of line around a second axially adjacent loop of the figure-eight configuration, and extending the line over the cross-over area;

repeating the winding and extending steps until excess line has been wound on the winding surface formed in the shape of a section of a tube.

* * * * *